United States Patent [19]
Leeper

[11] Patent Number: 5,992,243
[45] Date of Patent: Nov. 30, 1999

[54] FOUR-WHEEL DRIVE TRANSFER CASE WITH TORQUE SENSING

[75] Inventor: Robert Leeper, Ft. Wayne, Ind.

[73] Assignee: Dana Corporation, Toledo, Ohio

[21] Appl. No.: 08/781,984

[22] Filed: Dec. 21, 1996

[51] Int. Cl.[6] ............................................... G01M 15/00
[52] U.S. Cl. ........................................ 73/862.31; 180/247
[58] Field of Search .............................. 180/247; 74/337; 475/257, 263, 266; 73/862.31, 862.08, 862.195

[56] References Cited

U.S. PATENT DOCUMENTS

| | | | |
|---|---|---|---|
| 3,704,637 | 12/1972 | Morden et al. | 74/337 |
| 3,718,054 | 2/1973 | Perkins et al. | 475/266 |
| 3,757,605 | 9/1973 | Morden | 74/337 |
| 4,464,954 | 8/1984 | Van Doorne | 475/257 |
| 4,497,222 | 2/1985 | Nagaoka et al. | 74/337 |
| 4,672,862 | 6/1987 | Chana | 74/337 |
| 4,729,260 | 3/1988 | Dudden | 475/266 |
| 5,263,906 | 11/1993 | Antonov | 475/266 |
| 5,323,871 | 6/1994 | Wilson et al. | 180/247 |
| 5,332,060 | 7/1994 | Sperduti et al. | 180/247 |
| 5,346,032 | 9/1994 | Sasaki | 180/247 |
| 5,400,866 | 3/1995 | Wilson et al. | 180/247 |
| 5,487,004 | 1/1996 | Amsallen | 74/337 |
| 5,511,448 | 4/1996 | Kameda et al. | 180/247 |
| 5,514,044 | 5/1996 | Antonov | 475/266 |
| 5,522,777 | 6/1996 | Baxter et al. | 180/247 |
| 5,546,822 | 8/1996 | Fowler | 74/337 |
| 5,564,992 | 10/1996 | Cunningham | 475/257 |
| 5,599,249 | 2/1997 | Zalewski et al. | 180/247 |

*Primary Examiner*—Eric S. McCall
*Attorney, Agent, or Firm*—Oldham & Oldham Co. L.P.A.

[57] ABSTRACT

A four-wheel drive transfer case including a force sensor and associated electronics for sensing the reaction forces on driven members within the transfer case, such as in association with an output shaft and its bearings. The force sensor and associated control system establish an output signal which varies depending upon the magnitude of the reaction force and yields an indication of the torque distribution between the output shafts of the transfer case. The output voltage signal is used by a torque monitoring and control system to vary and/or limit the magnitude of torque transmitted to the output shaft.

20 Claims, 3 Drawing Sheets

5,992,243

FOUR-WHEEL DRIVE TRANSFER CASE WITH TORQUE SENSING

FIELD OF INVENTION

The present invention relates generally to a four-wheel drive transfer case, and more particularly to a four-wheel drive transfer case including a force sensor and associated electronics for sensing the reaction force on a transfer case output shaft to yield an indication of torque applied to the shaft. The load sensor and associated electronics as described herein establish an output signal which varies depending upon the magnitude of the output shaft. The output force on signal is used by a transfer case control system to vary the magnitude of torque transmitted to the output shaft.

BACKGROUND OF THE INVENTION

Transfer cases are generally well known devices for providing a truck, automobile, or other vehicle with four-wheel drive capability. These four-wheel drive transfer cases include a housing which rotatably supports an input shaft for receiving torque from the primary transmission of the vehicle, as well as front and rear output shafts for transferring torque from the input shaft to the front and rear wheels of the vehicle, respectively. The transfer case may be provided with shifting means controllable by the driver for shifting the transfer case between the two-wheel and four-wheel drive modes as driving conditions warrant. More sophisticated transfer cases, such as "on-demand" four-wheel drive transfer cases, include automatic shifting means for automatically shifting the transfer case between two-wheel and four-wheel drive modes in response to variations in driving conditions. These transfer cases and shifting systems include complex electronic sensing systems for monitoring vehicle and road wheel speeds and other parameters such that the transfer case can be automatically shifted between two-wheel and four-wheel drive modes in response to the monitored vehicle conditions. Also, full-time four-wheel drive transfer cases may include an interaxle differential between the front wheels and the rear wheels of the motor vehicle.

Unlike part time four-wheel drive systems, a full-time four-wheel drive transfer case with an interaxle differential allows the front wheels and the rear wheels to rotate at different speeds with constant torque split, which occurs during normal operating conditions when, for example, turning the motor vehicle or in the event that the front wheels and the rear wheels have tires with different diameters. However, to prevent excessive slipping or differentiation between the front and the rear wheels, as might occur when one set of wheels encounters a low-traction condition such as ice, these transfer cases typically include a selectively engageable clutch which is operative to lock the interaxle differential upon sensing a predetermined amount of slippage. Locking of the interaxle differential prevents any relative slip or differentiation between the front output shaft and the rear output shaft of the transfer case. The "full-time" four wheel drive transfer cases may include systems for controlling the clutch assembly in a more sophisticated fashion to quickly "modulate" or regulate the speed of the vehicle wheels by varying the torque being transferred to the front and rear wheels of the vehicle to vary the handling characteristics of the vehicle during turns and other maneuvers. Known "full-time" four-wheel drive systems require electronic speed sensors positioned at the wheel ends or elsewhere to sense the angular velocity of each road wheel or output shaft such that the variation in angular velocity between the front and rear wheels may be monitored, with an excessive amount of variation in rotational speed being indicative of a low traction condition at the faster rotating wheel.

Generally, in a basic four-wheel drive transfer case, the input shaft receives torque directly from the primary transmission of the vehicle. The input shaft is connected to a rear output shaft of the transfer case such that the rear output shaft receives torque directly from the input shaft. Alternatively, the input shaft may be provided as one long shaft that travels through the transfer case, thus acting as the input and rear output shafts. The rear output shaft extends outward from the rear of the transfer case housing such that it may provide the input torque to the differential assembly of the rear wheels.

The front drive shaft of a four-wheel drive transfer case is offset from and parallel to the rear output shaft. The front drive shaft extends outward through the front of the transfer case housing and is connected to a differential that provides torque to the front road wheels of the vehicle. A drive sprocket is rotatably mounted about the rear output shaft of the transfer case and a clutch mechanism is provided for selectively coupling the drive sprocket to the rear drive shaft such that the sprocket rotates therewith. The front output shaft includes a sprocket that is connected to rotate therewith at all times, and a drive chain, belt, or the like is connected between these two sprockets such that torque is transferred to the front output shaft of the transfer case any time the four-wheel drive clutch assembly is actuated. Thus, two-wheel drive mode (torque being transferred to the rear wheels of the vehicle only) is provided when the clutch assembly is disengaged, and four-wheel drive mode (torque being transferred to all four vehicle wheels) is provided when the clutch is engaged. As an alternative to a drive chain or belt, one or more gears may be used to transfer torque to the front output shaft.

Recently, there has been an ever increasing demand for cars and trucks including four-wheel drive systems such as those described above. Furthermore, the purchasing public is demanding increasingly complex transfer cases that provide superior performance and durability without being unduly expensive. As described above, known transfer cases rely on speed sensors to provide data to the transfer case control system to control the split of torque between the front and rear output shafts. Such transfer cases do not include torque sensors which are connected to a torque monitoring and control system for monitoring the radial bearing load force on the bearings of the front and/or rear output shafts of the transfer case and converting the magnitude of the sensed bearing load into a related torque value that may be utilized by the control system to control the amount of torque transmitted to the shaft being monitored. Furthermore, the torque monitoring and control system may be utilized to limit the torque being transferred to the relevant shaft when the sensed bearing load approaches a predetermined threshold to thus prevent an overload of the shaft and its related components.

SUMMARY OF THE INVENTION

The present invention is therefore directed to a transfer case comprising a transfer case housing, an input shaft, a front output shaft, and a rear output shaft. Each of the shafts is rotatably supported relative to the transfer case housing and the front and rear output shafts receive torque from the input shaft. The torque sensing transfer case also comprises a torque measuring force sensor provided in association with a component of the drive system to which torque is transferred, such as a bearing assembly of one or more of the shafts of said transfer case, the drive chain or like component which transfers torque between shafts, or gears used to transfer torque between or to shafts of the transfer case. In the case of the bearings, the torque sensor may be used to sense the radial load force exerted on the bearing assembly of the shaft in response to torque transmitted to the shaft which is proportional to the torque on the shaft. With respect to the chain drive, gear mechanisms or like components, the reaction force on the component may be sensed to relate to torque applied to the component and ultimately a shaft of the transfer case.

The present invention provides the ability to monitor the forces applied to one or more components of the transfer case as an indication of torque, and to control the amount of torque transmitted to a shaft of the transfer case. The torque transmitted may be varied to change the vehicle handling characteristics and/or to prevent a torque overload of the transfer case components.

DETAILED DESCRIPTION OF THE INVENTION

Figure 1:
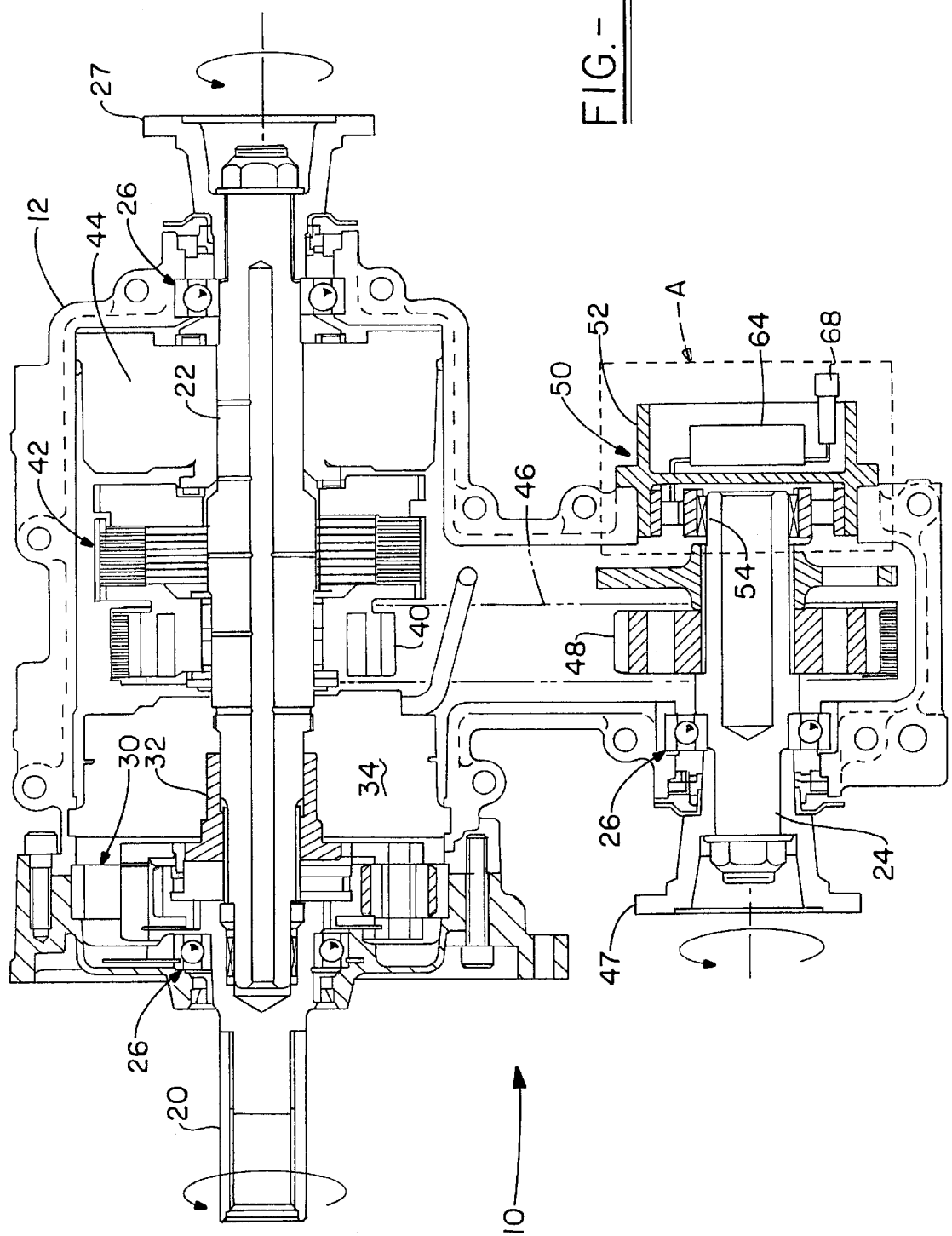
FIG. 1 is a top view in cross-section of a transfer case in accordance with the present invention.
Figure 2:
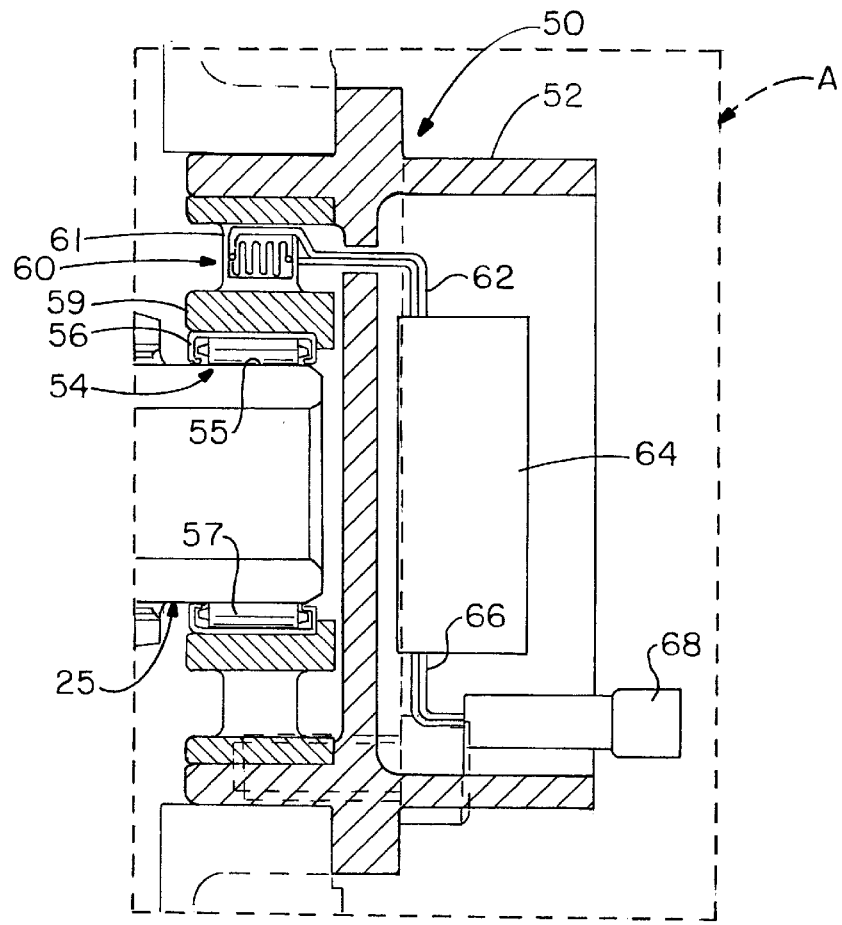
FIG. 2 is an enlarged view of portion "A" of the transfer case shown in FIG. 1.

Referring now to FIGS. 1–2, a vehicle torque sensing transfer case in accordance with a first embodiment of the present invention is shown generally at 10 and comprises an input shaft 20, a rear output shaft 22, and a front output shaft 24 all rotatably supported relative to a transfer case housing 12 by bearing assemblies 26 and other bearings which are shown but not numbered. Input shaft 20 is ordinarily connected to a vehicle transmission and transfers torque from the vehicle transmission to the rear output shaft 22 either through a direct coupling (providing a 1:1 speed ratio between shafts 20,22) or through a planetary gear set 30 (providing an X:1 coupling between shafts 20,22 where X >1) depending upon the axial position of a splined shift collar 32 which is controlled by the shift collar actuator 34 in response to commands from the driver of the vehicle. Torque transferred to the rear output shaft 22 is ultimately transferred to a yoke 27 to which a vehicle drive shaft may be coupled to transfer torque to a differential and to the rear road wheels of the vehicle.

As shown herein, transfer case 10 comprises a drive sprocket 40 rotatably mounted about shaft 22 and a four-wheel drive clutch assembly 42 for selectively drivingly coupling the sprocket 40 to shaft 22 in a well known manner. A four-wheel drive clutch actuator 44, is provided which may be mechanical, electromechanical, hydraulic, vacuum operated, or any other suitable type of actuator for selectively engaging, partially engaging, or disengaging clutch 42. When clutch 42 is at least partially engaged, torque from shaft 22 is transferred through clutch 42 to drive sprocket 40, and a drive member 46, which may be a chain (as shown herein), a belt, one or more gears, or any other suitable drive member. Drive member 46 in turn transfers torque to front output shaft 24 through drive sprocket 48 which is coupled to rotate with shaft 24. The sprocket 48 in association with the drive chain or member 46, has force applied thereto to cause rotation of the shaft 24. Torque is thus transferred from shaft 24 to yoke 47 where a vehicle drive shaft may be connected for transmission of the torque to a front differential for distribution to the front road wheels of the vehicle as an example.

The transfer of torque to shaft 24 through drive member 46 results in a reaction force on shaft 24, causing deflection of shaft 24 relative to the housing 12, with the magnitude of the reaction force and resulting deflection being greater for larger values of torque. Thus, for example, as shown herein, transmission of torque to shaft 24 through drive member 46 (shown as a chain) primarily results in a deflection of shaft 24 toward shaft 22. The use of one or more gears in a plane with drive member 46 would result primarily in the deflection of shaft 24 in a plane perpendicular to the plane in which shafts 22,24 are located. Alternatively, if an offset idler gear is used to transmit torque from shaft 22 to the shaft 24, primary deflection would be in a plane perpendicular to the axis of the idler gear and the axis of the shaft 24 as will be hereinafter described.

In the first embodiment, the transfer case 10 senses the reaction force or deflection of shaft 24 under torque load and controls the amount of torque being transferred to shaft 24 based upon the sensed deflection. Those skilled in the art will recognize that the deflection of shaft 22 may alternatively or additionally be sensed as described herein, and the invention is not meant to be limited to sensing the deflection of shaft 24. Additionally, the reaction forces on various other components of the transfer case can be sensed to give an indication of torque. Furthermore, transfer case 10 and the above-described components thereof may be varied without departing from the scope of the present invention. For example, transfer case 10 may include an interaxle planetary differential for dividing torque between shaft 22 and sprocket 40, and clutch 42 could be utilized to selectively lock any such interaxle planetary differential as is known in the art.

Referring now specifically to portion "A" of FIG. 1, and the enlargement thereof shown in FIG. 2, a force sensor is utilized in this embodiment, shown generally at 50, which may comprise a sensor housing 52. The sensor housing may be rigidly connected to transfer case housing 12 by bolts or the like. Alternatively, sensor housing 52 may be integrally formed with transfer case housing 12. In addition to the bearings 26 noted above, shaft 24 is rotatably supported by a bearing assembly 54 which comprises an inner race 55, an outer race or cage 56, and a plurality of rolling elements 57 positioned between and engaged with inner and outer races 55,56. The bearing assembly may be positioned within a bearing housing 59. As shown herein, inner race 55 is formed on the outer surface 25 of shaft 24, but those skilled in the art will recognize that inner race may be provided by a separate component piloted on the outer diameter of shaft 24. Similarly, the outer cage 56 may be eliminated, and the bearing housing 59 could be piloted to form the outer bearing race.

In the preferred embodiment, the bearing assembly 54 provides a convenient location to monitor reaction forces applied to the shaft 24 via the drive member 46 coupled for rotation with shaft 22. As shown in this embodiment in particular, the bearing assembly 54 may be positioned within a bearing housing 59 which in turn can be at least partially, and preferably completely surrounded by sensor housing 52. A strain gauge 60 is positioned between bearing housing 59 and sensor housing 52, and is electrically connected through connection 62 to the input of a voltage amplifier 64. Many different types of strain gauges are generally known and may be used as part of the force sensor 50, or another type of sensor may also be used to effectively measure the reaction force applied through drive member 46 to yield an indication of torque applied to the driven shaft 24. Deflection of shaft 24 caused by the reaction force, and consequently of bearing assembly 54, in response to received torque causes a variation in the electrical resistance of the strain gauge 60 at the input to amplifier 64. Those skilled in the art will recognize that as the torque present in shaft 24 increases, the magnitude of the deflection of shaft 24 and bearing assembly 54 will also increase, resulting in different sensed value of the force by strain gauge 60 which is proportional to the torque applied to the shaft. In the preferred embodiment, the force sensor 50 includes a support member or column 61 which is positioned between the bearing 54 housing and the sensor housing 52, and on one end of which is positioned the strain gauge 60. The support member 61 may have a plurality of ribs or the like which are supported between the bearing housing 59 and sensor housing 52, such that a reaction force applied to the shaft 24 and in turn the bearing housing 59 is detected by the strain gauge 60 as described. The support member 61 is preferably configured such that the deflection of the shaft 24 from the reaction force applied by drive member or chain 46 is amplified for detection by the strain gauge 60. While the input signal to amplifier 64 and the output therefrom may have many different ranges of values as desired, it is thought preferable to configure the force sensor 50 such that the output voltage signal from amplifier 64 is a value in the range of 0–5 volts D.C.

Figure 4:
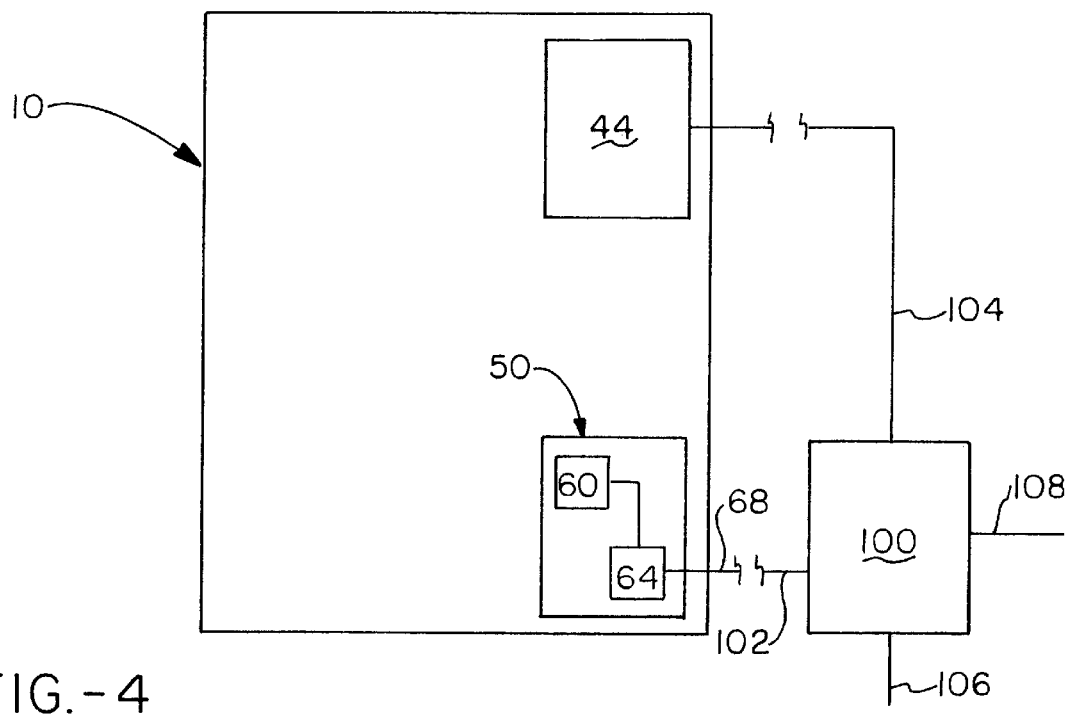
FIG. 4 is a schematic representation of a transfer case torque monitoring and control system in accordance with the present invention.

Amplifier 64 has a predetermined voltage gain such that the input voltage signal thereto is amplified and output through electrical connection 66 and a connector 68 which is adapted to be coupled with a mating electrical connector. Preferably, connector 68 is a waterproof connector and is connected to a torque monitoring and control system 100 as is schematically shown in FIG. 4 and as is discussed in further detail below. If amplifier 64 is provided as a part of force sensor 50, it must also be protected from dirt, water, oil, and other foreign matter. Thus, amplifier 64 is preferably electronically potted with sensor 50 (sealed within a layer of weatherproof plastic or similar material). Also, connector 68 may serve as the electrical power input to force sensor 50.

Figure 3:
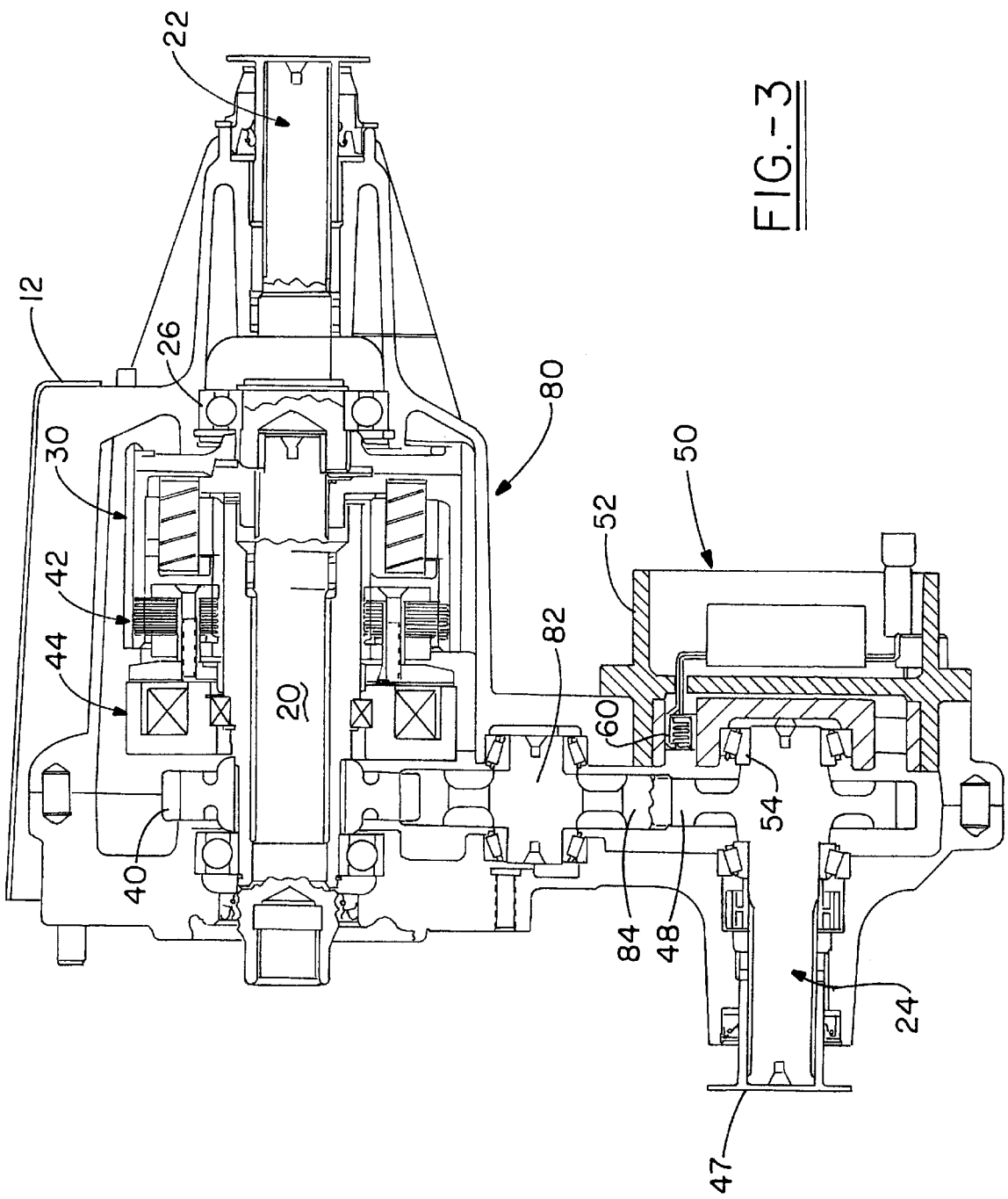
FIG. 3 is a cross-section of a transfer case in our alternate embodiment of the invention.

In an alternative embodiment of the invention, FIG. 3 shows a transfer case 80, which may again be configured in a variety of ways and may have many similar components to the transfer case 10, and furthermore may have the components thereof varied without departing from the scope of the present invention. Similar reference numerals will be used to identify similar components of this preferred embodiment. The transfer case 80 may again comprise an input shaft 20, a rear output shaft 22, and a front output shaft 24 all rotatably supported relative to a transfer case housing 12 by bearing assemblies 26 and other bearing assemblies. Input shaft 20 is ordinarily connected to a vehicle transmission and transfers torque from the vehicle transmission to the rear output shaft 22 either through a direct coupling or through a planetary gear set to give high speed and low speed ranges. Torque in the rear output shaft 22 is ultimately transferred to a drive shaft coupled to transfer torque to a differential and to the rear road wheels of the vehicle.

As with the previous embodiment, transfer case 80 may further comprise a drive sprocket 40 rotatably mounted about shaft 22 and a four-wheel drive clutch assembly 42 for selectively drivingly coupling the sprocket 40 to shaft 22 in a well known manner. A four-wheel drive clutch actuator 44, which may again be mechanical, electro-mechanical, hydraulic, vacuum operated, or any other suitable type of actuator is provided for selectively engaging, partially engaging, or disengaging clutch 42. When clutch 42 is at least partially engaged, torque from shaft 22 is transferred through clutch 42 to drive sprocket 40. In this embodiment, an offset idler shaft 82 is disposed between the shafts 22 and 24 to provide a suitable drive member which is coupled to drive sprocket 40 through an intermeshing sprocket 84. The sprocket 84 in turn is coupled to drive sprocket 48 which is coupled to rotate with output shaft 24. The shafts 22 and 24 are offset, and idler shaft 82 is used to couple these shafts to transmit torque therebetween, and provides another example of a component from which torque measurements may be obtained in the torque sensing transfer case of the invention. In this embodiment, the reaction force on the shaft 24 created by the idler gear 82 may be sensed to give an indication of torque split between shafts 22 and 24 as desired. This in turn allows the control system of the invention (to be hereinafter described) to more effectively control transfer case operation as desired. The force applied to the sprocket 48 causes rotation of the shaft 24 and yoke 47 where a vehicle drive shaft may be connected for transmission of the torque to a front differential for distribution to the front road wheels of the vehicle as an example.

Again in this embodiment, the idler shaft 82 and associated gear or sprocket 84 in conjunction with the drive shaft 22, transmits torque in a manner which creates a measurable reaction force associated with the driven shaft 24 or idler shaft 82 for example. The interrelationship between the idler shaft 82 and shaft 24 will primarily cause deflection of shaft 24 in a plane perpendicular to the plane in which the centerlines of shaft 24 and idler shaft 82 lie, and therefore the reaction force may be measured within a plane perpendicular to this plane. As shown in FIG. 3, the force sensor 50 may be similarly conveniently positioned about shaft 24 to measure force in the plane perpendicular to or opposing the reaction force created between the shafts. For clarity, sensor 50, and particularly the strain gauge 60 are shown rotated about shaft 24 approximately 90 degrees from the actual measuring position for this embodiment, wherein the strain gauge 60 is positioned in a plane perpendicular to the plane in which the centerlines of shafts 24 and 82 lie. It should also be recognized that as with the previous embodiment, although the housing of bearing assembly 54 may again be a convenient location for measuring the reaction force between these shafts to determine torque distribution between the shafts, the sensor 50 may be positioned at other locations in opposition to the reaction force created between drive and driven members in the transfer case. It should also be recognized that the torque sensing arrangement of the invention will apply to other drive configurations which may be used in the transfer case as alternatives to the configurations shown in the preferred embodiments of the invention, with the reaction force between various drive and driven members being measured. Thus for example, the reaction force from a chain drive member as in the first embodiment, an idler shaft as in the second, a gear set or the like, on a driven member can be measured in accordance with the invention. It is further possible to obtain multiple measurements relating to torque distribution in the transfer case, which can be used alone or in conjunction with other operational parameters of the vehicle to provide effective control over transfer case operation.

Referring now particularly to FIG. 4, a monitoring and control system in accordance with the present invention is shown schematically at 100 and is electrically connected to transfer case 10 or 80. Specifically, a vehicle monitoring and control system 100 is connected to the sensor 50 via the output of amplifier 64 through connector 68. Thus, monitoring and control system 100 may receive as one input signal at 102 the amplified output voltage signal from amplifier 64, the magnitude of which signal varies depending upon the magnitude of the reaction force measured by the sensor 50. Based upon the magnitude of the voltage signal received at input 102, the monitoring and control system 100 may be configured to output control signals to control operation of the transfer case 10 or 80. For example, the control system 100 may be used to control the four-wheel drive clutch actuator 44 of the transfer case through electrical connection 104 to modulate or regulate the four-wheel drive clutch actuator 44. This may actuate four wheel drive operation automatically or can be used to vary the amount of torque transferred to shaft 24 from shaft 22. Therefore, the torque monitoring and control system 100 provides a mechanism for modulating the torque transferred to shaft 24 to change the vehicle handling characteristics. The system 100 may also provide a mechanism for preventing torque overload of the transfer case components, the latter being accomplished by using system 100 to limit the deflection of shaft 24 to a predetermined value or threshold. The monitoring and control system 100 may also control other vehicle functions if desired, and may also receive additional input signals such as at 106 or 108 to refine or enhance the torque monitoring capabilities of the system or to facilitate transfer case control. For example, the monitoring and control system 100 may also receive input signals at 106 from speed sensors associated with the shafts 22 or 24 or other components of the transfer case 10 or 80, to refine or supplement the torque sensing for more effective control over transfer case operation. Further, other vehicle operating conditions such as the throttle position of the vehicle may be sensed and input to the control system 100 at 108 to anticipate the need to alter transfer case operation, with these or other signals being used in conjunction with torque sensing to control the transfer case. The control system 100 may also be used to process the various signals to obtain unique monitoring and analysis of vehicle operating conditions, such as for example, monitoring the rate of torque increase or decrease to determine transfer case operation and control of clutch actuator 44 or other transfer case components.

Those skilled in the art will recognize that the foregoing description has set forth the preferred embodiment of the invention in particular detail and it must be understood that numerous modifications, substitutions and changes can be undertaken without departing from the true spirit and scope of the present invention as defined by the ensuing claims.

What is claimed is:

1. A transfer case comprising:
   a transfer case housing;
   an input shaft, and first and second output shafts, each of said shafts rotatably supported relative to said transfer case housing, wherein said first and second output shafts selectively receive torque from said input shaft;
   at least one force sensor provided in a position relative to a driven member in said transfer case directly to sense a reaction force exerted on said driven member in response to torque transmitted to at least one of said first and second output shafts to give an indication of torque transmitted by at least one of said output shafts, said force sensor generating at least a first signal corresponding to said sensed force; and
   a control system for receiving said at least first signal from said force sensor, said control system generating output control signals used to control operation of said transfer case.

2. A transfer case as recited in claim 1, wherein said force sensor is provided in association with a bearing assembly of at least one of said output shafts, and includes a housing wherein said bearing assembly of said at least one shaft is at least partially contained within said housing.

3. A transfer case as recited in claim 2, wherein said bearing assembly comprises an inner race, an outer race, and a plurality of rolling elements positioned between and engaged with said inner and outer races, and wherein said housing of said force sensor substantially surrounds said outer race of said bearing assembly.

4. A transfer case as recited in claim 3, wherein said inner race of said bearing assembly is formed on the outer surface of said at least one shaft.

5. A transfer case as recited in claim 1, wherein said at least one force sensor includes a housing and at least one strain gauge positioned between said housing and said driven member at a predetermined position where said at least one strain gauge senses a reaction force from a drive member applied to said driven member.

6. A transfer case as recited in claim 5, wherein said at least one force sensor further comprises an amplifier, said amplifier receiving a signal associated with said strain gauge to generate an output signal.

7. A transfer case as recited in claim 6, wherein said amplifier is electronically potted within said at least one force sensor housing and comprises an electrical connector connected thereto and extending outward from said transfer case housing for connection with a mating electrical connector.

8. A transfer case as recited in claim 6, wherein said amplifier has a predetermined voltage gain and wherein said amplifier produces an output voltage signal in the range of approximately 0–5 volts.

9. A transfer case as recited in claim 1, wherein said first and second output shafts are front and rear output shafts, and said at least one force sensor is provided in association with a bearing assembly of said front output shaft of said transfer case.

10. A transfer case as recited in claim 1, wherein one of said first or second output shafts is selectively drivingly coupled to the other of said output shafts by a drive member, wherein said at least one force sensor is positioned to measure a reaction force between said drive member and said driven output shaft.

11. A transfer case as recited in claim 10, wherein said drive member is an idler shaft and said at least one force sensor is positioned to measure a reaction force in a plane which is substantially perpendicular to the plane formed by the centerline of said driven output shaft and the centerline of said idler shaft.

12. A transfer case as recited in claim 11, wherein said driven output shaft is offset from the other of said first or second of said output shafts, and wherein said driven output shaft is drivingly coupled to the other of said output shafts by said idler shaft.

13. A transfer case as recited in claim 10, wherein said drive member is provided between said first and second output shafts and said at least one force sensor is positioned to measure a reaction force in a plane which is substantially perpendicular to the plane formed by the centerline of said first and second output shafts.

14. A transfer case as recited in claim 10, wherein said drive member comprises at least one gear and said at least one force sensor is positioned to measure a reaction force in a plane which is substantially perpendicular to the plane formed by the centerline of said driven output shaft and the centerline of said gear.

15. A transfer case as recited in claim 2, wherein said force sensor housing is rigidly connected to said transfer case housing.

16. A transfer case as recited in claim 10, wherein said drive member deflects said driven output shaft in substantially only one plane, and wherein said force sensor senses the deflection of said driven output shaft toward said drive member.

17. A transfer case as recited in claim 1, wherein said control system is connected to a four-wheel drive clutch actuator of said transfer case such that said control system can modulate said four-wheel drive clutch actuator based upon the input received from said force sensor.

18. A transfer case as recited in claim 17, wherein said control system modulates said four-wheel drive clutch actuator to limit the amount of torque transferred to said driven member when a predetermined torque threshold is reached.

19. A transfer case as recited in claim 1, wherein said control system further receives input signals relating to operational parameters of said transfer case, and generates said output control signals.

20. A transfer case as recited in claim 1, wherein said transfer case is used in a vehicle and said control system further receives input signals relating to operational parameters of said vehicle, and generates said output control signals.

* * * * *